3,699,096
PROCESS FOR PREPARING PENICILLIN DERIVATIVES

Helmut Wilhelm Otto Weissenburger, deceased, late of Rijswijk, Netherlands, by Ludmilla Weissenburger, nee Lubimowa, administrator, 32 Cromhoutlaan, Rijswijk, Netherlands
No Drawing. Filed Dec. 22, 1969, Ser. No. 1,829
Int. Cl. C07d 99/16
U.S. Cl. 260—239.1          13 Claims

ABSTRACT OF THE DISCLOSURE

This invention is concerned with the preparation of novel sulfonic acid addition salts of aminopenicillins that have bactericidal activity and with processes for their production.

DESCRIPTION OF THE PRIOR ART

Dutch patent application No. 299,854 and U.S. Pat. 3,180,862 are concerned with the preparation of sulfonic acid salts of aminopenicillins of the type wherein the sulfonic acid moiety is linked to a phenyl or naphthyl group. The prior art process for the production of the above described sulfonic acid addition salts of aminopenicillins teaches a concentration of 25 to 100 mg. of an aminopenicillin per ml. of solution. The sulfonic acids employed in the practice of this invention, while not restricted to use therein, are usable in solutions which contain aminopenicillin at a concentration of less than 25 mg./ml.; for instance, a concentration of 10 mg./ml. may be utilized.

This invention is concerned with the production of novel sulfonic acid addition salts of aminopenicillins. Generally any penicillin which contains an $NH_2$ group may be utilized in preparing the novel compounds of the invention. The process by which these novel sulfonic acid salts are prepared may be used to separate the aminopenicillin from mixtures which contain the other products of side reactions which occur in the production of the desired aminopenicillin.

The compounds of the invention are those of Formula I

FORMULA I $$R-\underset{\underset{O}{\|}}{C}-NH-CH-\underset{O=C-N}{\overset{S}{\diagup}}\overset{CH_3}{\underset{CH-COOH}{\diagdown}}C-CH_3 \cdot R_9-R_{10}-R_{11}-SO_3H$$

wherein R is an amino containing group.

$R_9$ is selected from the group consisting of phenyl, biphenyl, naphthyl, phenylcarbamylphenyl and phenylcarbamylnaphthyl.

$R_{10}$ is selected from the group consisting of oxygen and a direct bond.

$R_{11}$ is selected from the group consisting of phenylene and (lower)alkylene.

When used herein and in the appended claims, the term "(lower)alkyl" contemplates hydrocarbon radicals, straight and branched, of from about 1 to about 6 carbon atoms; illustrative members of the group being methyl, ethyl, n-propyl, i-propyl, n-butyl, t-butyl, n-pentyl, n-hexyl and the like. The term "(lower)alkoxy" contemplates hydrocarbonoxy groups of from about 1 to about 6 carbon atoms, straight chain and branched, and includes methoxy, ethoxy, n-propoxy, i-propoxy, n-butoxy, t-butoxy, n-pentoxy, n-hexyloxy, and the like. The term "(lower)alkanoyl" is used to mean acyl groups of 1 to about 6 carbon atoms such as formyl, acetyl, propionyl, butyryl and the like. The term "carbo(lower)alkoxy" contemplates carbonyl groups substituted with (lower)alkoxy as defined above. The term "cyclo(lower)alkyl" is used herein to include cyclohexyl, cyclopentyl and cycloheptyl. By the expression (lower)alkylene is meant to include methylene, ethylene, propylene and butylene. The term "aminopenicillin" is used herein to describe a compound of the formula:

$$R-\underset{\underset{O}{\|}}{C}-NH-CH-\underset{O=C-N}{\overset{S}{\diagup}}\overset{CH_3}{\underset{CH-COOH}{\diagdown}}C-CH_3$$

wherein R is an amino containing group.

The following aminopenicillins may be employed in the practice of the invention

FORMULA II $$R_2-\underset{R_3}{\overset{R_1}{\bigodot}}-CH-\underset{NH_2}{\overset{O}{\underset{\|}{C}}}-NH-CH-\underset{O=C-N}{\overset{S}{\diagup}}\overset{CH_3}{\underset{CH-COOH}{\diagdown}}C-CH_3$$

wherein $R_1$, $R_2$ and $R_3$ are selected from the group consisting of hydrogen, nitro, di(lower)alkylamino, (lower)alkanoylamino, (lower)alkanoyloxy, (lower)alkyl, (lower)alkoxy, sulfamyl, chlorine, iodine, bromine or fluorine, trifluoromethyl, (lower)alkylthio, (lower)alkylsulfonyl, carbo(lower)alkoxy, phen(lower)alkyl, cyclo(lower)alkyl.

As a specific embodiment of Formula II is mentioned D(—)-α-aminobenzylpenicillin.

FORMULA III $$\underset{R_4}{\overset{R_5}{\bigodot}}\underset{(CH_2)}{\overset{NH_2}{\diagup}}CH-\underset{\underset{O}{\|}}{C}-NH-CH-\underset{O=C-N}{\overset{S}{\diagup}}\overset{CH_3}{\underset{CH-COOH}{\diagdown}}C-CH_3$$

wherein $R_4$ and $R_5$ are each selected from the group consisting of hydrogen, (lower)alkyl, (lower)alkoxy, phenyl and phenoxy; and $n$ is an integer from 1 to 2.

As a specific embodiment of Formula III is mentioned 6-(indan-2-amino-2-carboxamido)penicillanic acid. The production of compounds of Formula III is described in U.S. patent application, Ser. No. 656,669 now U.S. Patent 3,494,915 issued Feb. 10, 1970, which is incorporated by reference.

FORMULA IV $$\underset{R_6-NH}{\overset{(CH_2n)}{\bigodot}}\underset{\|}{\overset{O}{C}}-NH-CH-\underset{O=C-N}{\overset{S}{\diagup}}\overset{CH_3}{\underset{CH-COOH}{\diagdown}}C-CH_3$$

wherein $n$ is a whole number from 2 to 9; and R is selected from the group consisting of hydrogen and (lower)alkyl.

As specific embodiments of Formula III are mentioned:

6-(1-aminocyclopentanecarboxamido)penicillanic acid
6-(1-aminocyclobutanecarboxamido)penicillanic acid
6-(1-aminocyclohexanecarboxamido)penicillanic acid
6-(1-aminocyclooctanecarboxamido)penicillanic acid

FORMULA V

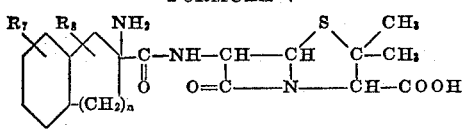

wherein $R_7$ and $R_8$ are each selected from the group consisting of hydrogen, (lower)alkyl, (lower)alkoxy, phenyl an phenoxy; and $n$ is an integer of from 1 to 2.

As a specific embodiment of Formula V is mentioned:

6-(2-amino-hexahydro-2-indancarboxamido)penicillanic acid.

The preparation of compounds of Formula V is fully described in U.S. Patent application, S.N. 852,467, now U.S. Pat. 3,621,011 issued Nov. 16, 1971, which is incorporated by reference.

FORMULA VI

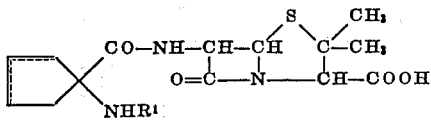

FORMULA VII

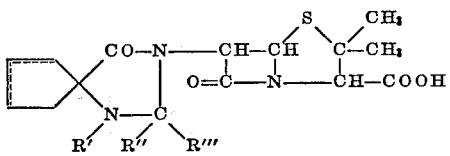

wherein R' is selected from the group consisting of hydrogen, lower alkyl, and phen(lower)alkyl; R" and R''' when taken separately are selected from the group consisting of hydrogen, lower alkyl and phenyl; R" and R''' when taken together with the carbon atom to which they are attached for a ring which is cyclo(lower)alkyl; the broken line represents a double bond in one of the two positions; and the non-toxic, biologically active salts thereof.

As a specific embodiment of Formula VI is mentioned:

6-(1-amino-3-cyclopentene-1-carboxamido)penicillanic acid.

The preparation of compounds of Formulas VI and VII is described in pending U.S. Patent application, S.N. 777,482, now U.S. Pat. 3,558,602 issued Jan. 26, 1971, which is incorporated by reference.

The penicillins which may be used as starting materials can occur in the form of their salts such as sodium, potassium, calcium, aluminum and ammonium salts. They can also occur in the form of their substituted ammonium salts, such as their trialkylamine, procaine, dibenzylamine, N-benzyl-β-phenethylamine, 1 - ephenamine, N,N' - dibenzyllethylenediamine, dehydroabietylamine, N,N'-bis-dehydroabietylethylenediamine and N-(lower)akylpiperdine salts as well as their easily hydrolysable esters or amides, which by chemical or enzymatic hydrolysis can be transformed into the free acids, can be considered suitable starting materials.

The solution of a compound of Formulas II to VII is contacted with a sulfonic acid of the formula:

FORMULA VIII

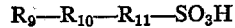

$$R_9 - R_{10} - R_{11} - SO_3H$$

wherein $R_9$ is selected from the group consisting of phenyl, biphenyl, naphthyl, phenylcarbamylphenyl and phenylcarbamylnaphthyl.

$R_{10}$ is selected from the group consisting of an oxygen atom or a direct bond.

$R_{11}$ is selected from the group consisting of phenylene and (lower)alkylene.

The compounds of Formula VIII may also be employed in the form of their salts.

The novel sulfonic acid salts of the aminopenicillins of this invention have valuable antibacterial properties and may be used as pharmacological agents in the treatment of infections caused by susceptible gram-positive and gram-negative bacteria. When administered parenterally or orally they are about as active against gram-positive and gram-negative bacteria as the corresponding aminopenicillin. Moreover, they are valuable intermediates for the preparation of the corresponding pure aminopenicillin.

As preferred embodiments of the usable sulfonic acids are mentioned the following compounds which may also be employed in the form of their salts:

biphenylsulfonic acid
phenoxybenzenesulfonic acid
3-(2-carbanilidophenoxy)-propanesulfonic acid
3-(1-naphthoxy)propanesulfonic acid
3-(2-naphthoxy)propanesulfonic acid
3-(2-phenoylphenoxy)propanesulfonic acid
3-(4-phenylphenoxy)propanesulfonic acid
3-(1-carbanilido-2-naphthoxy)-propanesulfonic acid In the preparation of the sulfonic acid addition salts of the invention, usually a concentrated aqueous solution of the free sulfonic acid is employed, although the water soluble alkali metal salts, alkaline earth metal salts, ammonium salts or substituted ammonium salts are suitable. Generally the sulfonic acid is admixed at a low temperature; for instance, at a temperature between about 0° and about 25° C., preferably between 0° and about 10° C., with an aqueous solution containing the aminopenicillin. This is done in order to avoid decomposition of the product and loss of solvent. Moreover, the crystallization of the product is thereby accelerated. The pH should be in the range of about 0.5 to about 4.5. It is advantageous to add a water-immiscible portion of an organic solvent to promote crystallization and the formatoin of a purer product. Generally, any solvent which is immiscible with water can be used. Solvents such as (lower)ketones and (lower) aliphatic esters may be employed. As specific examples of useful immiscible solvents are mentioned the following: methylsiobutylketone, amyl acetate, ethyl acetate, propyl acetate and butyl acetate.

In this preferred embodiment of this invention an aqueous solution of an α-aminobenzylpenicillin or a salt thereof is contacted with a water soluble sulfonic acid or salt thereof of the type described hereinabove. The pH of the reaction is adjusted to about between 0.5 and 3.5 by adding a mineral acid such as hydrochloric acid, sulfuric acid, etc., or adding a base such as sodium hydroxide, triethylamine, etc. A preferred pH range is 1.5 to 2.0. However, during the addition of the sulfonic acid the pH may be higher than 3.5 but the desired sulfonate is not formed until the pH is adjusted to about 0.5 to about 3.5. The reaction is stirred until crystallization is complete. The product may be separated by filtration after precipitation. Thereafter, it may be washed with water and/or an organic solvent, such as methylisobutylketone and then dried.

The following examples illustrate the preparation of the sulfonic acids used in the practice of the invention and shows their use in preparing the sulfonic acid addition salts of the invention.

The hydrates and anhydrous form of the α-aminobenzyl-penicillins of Formula II are within the scope of this invention. As is well known to those skilled in the art the α-carbon atom of the acyl group in certain of the penicillins is an asymmetric carbon atom and therefore the compounds of this invention can in some cases exist as the D- and L- diastereoisomers or as mixtures thereof.

EXAMPLE I

To a solution of 1 kg. of biphenyl in 3.5 l. of methylenechloride is added dropwise 423 ml. of chlorosulfonic acid in about 30 minutes at reflux temperature. The reaction mixture, with the already partially crystallized biphenyl-sulfonic acid is allowed to reflux another 2.5 hours. After cooling to 14° C., the crystals formed are filtered, washed on the filter with 1.5 l. of methylenechloride and air dried. Yield is 1421 g. of biphenylsulfonic acid monohydrate (=87%), melting at 138–142° C.

EXAMPLE II

To a solution of 100 g. of diphenylether in 300 ml. of methylenechloride, heated at reflux temperature, 38 ml. of chlorosulfonic acid is added dropwise in about 30 minutes. After addition of all chlorosulfonic acid the mixture is refluxed for another hour. Then the reaction mixture is diluted with 500 ml. of benzene and 10 ml. of distilled water are added. After cooling to 0° C. the crystal mass is filtered and washed with 200 ml. of benzene. After drying, 136 g. of p-phenoxybenzenesulfonic acid-monohydrate is obtained (86%), melting at 76–81° C.

EXAMPLE III

In a three-necked 5 l. flask 75.3 g. of sodium hydroxide is dissolved in 4.1 of alcohol; subsequently, 400 g. of salicylanilide are added. After heating up to about 75° C., 176 ml. of propanesultone are added dropwise at a rapid rate, while the reaction mixture is cooled. Subsequently, the mixture is refluxed for another two hours and thereafter cooled to about 6° C. The precipitate is filtered and washed with 250 ml. of alcohol. Yield: 528.5 g. (73.6%) of sodium 3-(2 - carbanilidophenoxy)-propanesulfonate, melting at 165°–168° C. A small amount of the sodium salt was purified by crystallization and treatment with activated carbon. The melting point then is 166–168° C.

EXAMPLE IV

According to the method described in Example III, α-naphthol, β-naphthol, 2-hydroxydiphenyl, 4-hydroxydiphenyl and 2 - hydroxy-1-naphthoic anilide were reacted with propanesultone to yield:

Sodium 3 - (1-naphthoxy)-propanesulfonate, M.P. 160°–165° C.
Sodium 3-(2-naphthoxy)-propanesulfonate.
Sodium 3 - (2 - phenylphenoxy)-propanesulfonate, with M.P. 139°–141° C.
Sodium 3 - (4 - phenylphenoxy)-propanesulfonate, M.P. 250°–255° C.
Sodium 3 - (1-carbanilido-2-naphthoxy)propanesulfonate, M.P. 212°–215° C.

The free acids can be prepared from the salts by adding concentrated hydrochloric acid. In this way, for instance, 3-(2-naphthoxy)propanesulfonic acid, M.P. 106°–108° C. is obtained.

EXAMPLE V

To 241 ml. of a 29% solution of biphenylsulfonic acids, 28 ml. of triethylamine is added. This solution is mixed with 200 ml. of methylisobutylketone and 3730 ml. of a filtered reaction mixture, with a pH of 3.7 containing, in addition to 12.9 g. of 6-aminopenicillanic acid, 52.0 g. of D(−)-α-aminobenzylpenicillin.

Ten ml. of 4 N·H$_2$SO$_4$ are added to the mixture thus obtained, at 22° C., so that the pH is lowered to 3.2 and crystallization of D(−)-α-aminobenzylpenicillin-biphenylsulfonate commences.

After stirring during 15 minutes another 5 ml. of 4 N·H$_2$SO$_4$ is added. Next the mixture is acidified further until a pH of 2.1 is reached and at the same time it is cooled until the temperature is brought down to 2° C.

The crystal needle suspension is filtered, the filter cake is then washed with 300 ml. of water at 0° C., that is acidified to pH 2.0 with biphenylsulfonic acid, and subsequently with 300 ml. of methylisobutylketone. The filtration and washing run smoothly. After drying 94 g. of D(−)-α-aminobenzylpenicillin-biphenylsulfonate is obtained with a content of 542 μg./mg. (purity 93.4%), corresponding to a yield of 97.8%.

From the acid addition salt 46.6 g. of anhydrous D(−)-α-aminobenzylpenicillin, with a purity of 98.9%, can be obtained by reaction with triethylamine at 75° C. in 85% isopropanol solution.

EXAMPLE VI

To 1600 ml. of a filtered aqueous reaction mixture with a pH of 4.8, which contains 26.1 g. of D(−)-α-aminobenzylpenicillin, and 10.5 g. unreacted 6-aminopenicillanic acid, are first added 100 ml. of methylisobutylketone while stirring and cooling to +2° C. and then 85 ml. of a 40% solution of p-phenoxybenzenesulfonic acid is added. Next the pH is adjusted to 2.05 with 4 N·H$_2$SO$_4$. After stirring for 2.5 hours at +2° C. the crystal mass is filtered and washed 3 times with 25 ml. portions of a 1% solution of p-phenoxybenzenesulfonic acid and thereafter with 100 ml. of methylisobutylketone. The filtrations run smoothly. After drying, 48.2 g. of D(−)-α-aminobenzylpenicillin p-phenoxy-benzenesulfonate is obtained, with a D(−)-α-aminobenzylpenicillin content of 507 μg./mg., corresponding to a yield of 93.5%.

EXAMPLE VII

To 1605 ml. of a clear solution of 21.6 g. of D(−)-α-aminobenzylpenicillin and 11.9 of unreacted 6-aminopenicillanic acid having a pH of 4.85, is added 40 g. of sodium 3-(2-carbanilidophenoxy)-propanesulfonate and 20 ml. of methylisobutylketone. With intensive stirring and gradual decrease of the temperature from 20° C., to +1° C., the pH is reduced to 2.0 by dropwise addition of a 4 N·H$_2$SO$_4$ solution.

After stirring for another 2 hours at 1° C., the crystal mass, which consists of plates, is filtered and washed with 30 ml. of water of pH 2.0 and 25 ml. of methylisobutylketone and dried 43.8 g. of acid addition salt with a content of 485 μg./mg. are obtained corresponding to a yield of 98.5%. Upon conversion into anhydrous D(−)-α-aminobenzylpenicillin, this salt yielded 10 g. of product, with a purity of 98.9%.

EXAMPLE VIII 1050 ml. of a clear solution (pH 4.9) containing, in addition to 3.75 g. of unreacted 6-aminopenicillanic acid, 16.9 g. of D(−)-α-aminobenzylpenicillin, is adjusted to a pH of 3.1 at 3° C. by the addition of 4 N.H$_2$SO$_4$. After the addition of 50 ml. of methylisobutylketone, a solution of 22 g. of 3-(2-naphthoxy)-propanesulfonic acid in 50 ml. of water is slowly added at a temperature of 1.5–3° C. with stirring. The pH is thereby lowered to 1.6 and the acid addition salt precipitates in the form of broad needles. After filtration and washing, the first two washings being made with 10 ml. of ice-water and second two with 25 ml. of methylisobutylketone and yield is 29.5 g. of D(−)-α-aminobenzylpenicillin 3-(2-naphthoxy)-propanesulfonate. The D(−)-α-aminobenzylpenicillin content thereof is 532 μg/mg. (yield 93%).

EXAMPLE IX

According to the method of Example V the following biphenylsulfonate derivatives are prepared by employing the appropriate substituted α-aminobenzylpenicillin:

α-amino-4-methylbenzylpenicillin-biphenylsulfonate
α-amino-4-ethylbenzylpenicillin-biphenylsulfonate
α-amino-4-trifluoromethylbenzylpenicillin-biphenylsulfonate
α-amino-3-sulfamylbenzylpenicillin-biphenylsulfonate
α-amino-2,4-dichlorobenzylpenicillin-biphenylsulfonate
α-amino-2-nitrobenzylpenicillin-biphenylsulfonate
α-amino-2-iodobenzylpenicillin-biphenylsulfonate
α-amino-4-ethoxybenzylpenicillin-biphenylsulfonate
α-amino-4-acetamidobenzylpenicillin-biphenylsulfonate
α-amino-4-dimethylaminobenzylpenicillin-biphenylsulfonate
α-amino-2-acetoxybenzylpenicillin-biphenylsulfonate
α-amino-4-fluorobenzylpenicillin-biphenylsulfonate α-amino-3,4-dibromobenzylpenicillin-biphenylsulfonate
α-amino-4-methylthiobenzylpenicillin-biphenylsulfonate
α-amino-3-propylthiobenzylpenicillin-biphenylsulfonate
α-amino-4-cycloheptylbenzylpenicillin-biphenylsulfonate
α-amino-4-cyclopentylbenzylpenicillin-biphenylsulfonate
α-amino-3,5-dimethylsulfonylbenzylpenicillin-biphenylsulfonate
α-amino-4-ethylsulfonylbenzylpenicillin-biphenylsulfonate
α-amino-3-carbomethoxybenzylpenicillin-biphenylsulfonate
α-amino-3-butylbenzylpenicillin-biphenylsulfonate
α-amino-4-cyclohexylbenzylpenicillin-biphenylsulfonate
α-amino-4-(benzyl)benzylpenicillin-biphenylsulfonate
α-amino-3-propylbenzylpenicillin-biphenylsulfonate
α-amino-4-phenethylbenzylpenicillin-biphenylsulfonate
α-amino-4-phenpropylbenzylpenicillin-biphenylsulfonate
α-amino-3-methoxybenzylpenicillin-biphenylsulfonate
α-amino-4-propoxybenzylpenicillin-biphenylsulfonate
α-amino-4-butoxybenzylpenicillin-biphenylsulfonate
α-amino-4-propionyloxybenzylpenicillin-biphenylsulfonate

EXAMPLE X

To 305 ml. of a filtered aqueous solution containing 45.0 g. of 6-(1-aminocyclohexanecarboxamido) penicillanic acid is added 42 ml. of methylisobutylketone and then, while stirring, 120 ml. of a 33% aqueous solution of diphenylethersulfonic acid is added at 10° C. The pH is adjusted to 2.0 with triethylamine. After stirring for 16 hours at 0–5° C., the mixture is filtered and the crystalline product is washed with cold water and then with methylisobutylketone. The yield of 6-(1-aminocyclohexanecarboxamido) penicillanic acid-phenoxybenzenesulfonate is 73 g. on a dry basis.

From this addition salt, 34.0 g. of anhydrous 6-(1-aminocyclohexanecarboxamido) penicillanic acid with a purity of 99% can be obtained by reaction with triethylamine at 80° C. in 85% isopropanol solution.

EXAMPLE XI

To 750 ml. of an aqueous solution containing about 102 g. of 6-(1-aminocyclohexanecarboxamido) penicillanic acid is added 77 ml. of methylisobutylketone and then 290 ml. of a solution containing 77 g. of biphenylsulfonic acid is added while stirring at 10° C. The pH is adjusted to 2.0 with triethylamine and the mixture is allowed to stir at 5–10° C. for 3 hours. The yield of 6-(1-aminocyclohexanecarboxamido) penicillanic acid-biphenylsulfonate is 156 g. on a dry basis.

From this addition salt, anhydrous 6-(1-aminocyclohexanecarboxamido) penicillanic acid with a purity of 98% can be obtained by reaction with triethylamine at 25° C. in methanol.

EXAMPLE XII

According to the method of Example V the following biphenyl sulfonate derivatives are prepared by employing the appropriate aminopenicillin:

6-(indan-2-amino-2-carboxamido)penicillanic acid biphenylsulfonate
6-(2-amino-hexahydro-2-indancarboxamido)penicillanic acid biphenylsulfonate
6-(1-amino-3-cyclopentene-1-carboxamido)penicillanic acid biphenylsulfonate.

What is claimed is:
1. A compound of the formula:

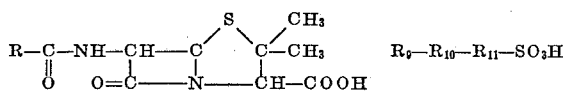

wherein R is an amino-containing group and $R_9$ is selected from the group consisting of phenyl, biphenyl, phenylcarbamylphenyl, naphthyl and phenylcarbamylnaphthyl; $R_{10}$ is selected from the group consisting of an oxygen atom and a direct bond; $R_{11}$ is selected from the group consisting of phenylene and (lower)alkylene, said amino-containing group being selected from the class consisting of

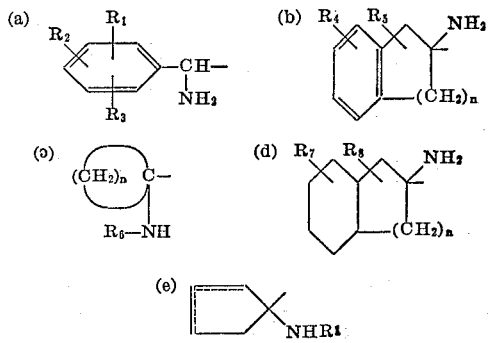

wherein $R_1$, $R_2$ and $R_3$ are selected from the group consisting of hydrogen, nitro, di(lower)alkylamino, (lower) alkanoylamino, (lower)alkanoyloxy, (lower)alkyl, (lower)alkoxy, sulfamyl, chlorine, iodine, bromine, fluorine, trifluoromethyl, (lower)alkylthio, (lower)alkylsulfonyl, carbo(lower)alkoxy, phen(lower)alkyl, cyclo(lower) alkyl; $R_4$ and $R_5$ are each selected from the group consisting of hydrogen, (lower)alkyl, (lower)alkoxy, phenyl and phenoxy; $R_6$ is selected from the group consisting of hydrogen and (lower) alkyl; $R_7$ and $R_8$ are each selected from the group consisting of hydrogen, (lower)alkyl, (lower)alkoxy, phenyl and phenoxy; $R^1$ is selected from the group consisting of hydrogen, (lower)alkyl and phen(lower)alkyl; the broken line represents a double bond in one of the two positions; and $n$ is an integer from 1 to 2 in the formula of group (b) and (d) and $n$ is a whole number from 2 to 9 in formula of group (c).

2. A compound as defined in claim 1 which is D(−)-α-aminobenzylpenicillin-biphenylsulfonate.

3. A compound as defined in claim 1 which is D(−)-α-aminobenzylpenicillin-phenoxybenzenesulfonate.

4. A compound as defined in claim 1 which is D(−)-α-aminobenzylpenicillin-3-(2-carbanilidophenoxy)-propanesulfonate.

5. A compound as defined in claim 1 which is D(−)-α-aminobenzylpenicillin-3-(1-naphthoxy)-propanesulfonate.

6. A compound as defined in claim 1 which is D(−)-α-aminobenzylpenicillin-3-(2-naphthoxy)-propanesulfonate.

7. A compound as defined in claim 1 which is D(−)-α-aminobenzylpenicillin-3-(2-phenylphenoxy)-propane sulfonic acid.

8. A compound as defined in claim 1 which is D(−)-α-aminobenzylpenicillin-3-(4-phenylphenoxy)propane sulfonic acid.

9. A compound as defined in claim 1 which is D(−)-α-aminobenzylpenicillin-3-(1-carbanilido-2-naphthoxy)-propanesulfonic acid.

10. A compound as defined in claim 1 which is 6-(1-aminocyclohexanecarboxamido)penicillanic acid - phenoxybenzenesulfonate.

11. A compound as defined in claim 1 which is 6-(1-aminocyclohexanecarboxamido) penicillanic acid-biphenylsulfonate.

12. A process for the preparation of a sulfonic acid addition salt of D(−)-α-aminobenzylpenicillin which comprises contacting a water-soluble sulfonic acid selected from the class consisting of biphenylsulfonic acid and phenoxybenzenesulfonic acid or a salt of said water-soluble sulfonic acid with an aqueous solution containing D(−)-α-aminobenzylpenicillin at a temperature in the range of about 0° to about 10° C. and adjusting the pH of said aqueous solution to about between 0.5 and about 3.5 to form the sulfonic acid salt of said D(—)-α-aminobenzylpenicillin.

13. A process for the preparation of a sulfonic acid addition salt of 6(1-aminocyclohexanecarboxamido)penicillanic acid which comprises contacting a water-soluble sulfonic acid selected from the class consisting of biphenylsulfonic acid and phenoxy benzenesulfonic acid or a salt of said water-soluble sulfonic acid with an aqueous solution containing 6(1-aminocyclohexanecarboxamido) penicillanic acid at a temperature in the range of about 0° to about 10° C. and adjusting the pH of said aqueous solution to about between 0.5 and about 3.5 to form the sulfonic acid salt of said 6(1-aminocyclohexanecarboxamido)penicillanic acid.

References Cited
UNITED STATES PATENTS 3,271,389    9/1966    Johnson et al. _____ 260—239.1

NICHOLAS S. RIZZO, Primary Examiner

U.S. Cl. X.R.

424—271